(12) United States Patent
Erhart et al.

(10) Patent No.: US 8,644,487 B2
(45) Date of Patent: Feb. 4, 2014

(54) ROUTING OF CONTACTS BASED ON PREDICTED ESCALATION TIME

(75) Inventors: George Erhart, Loveland, CO (US); Valentine Matula, Granville, OH (US); David Skiba, Golden, CO (US)

(73) Assignee: Avaya, Inc., Basking Ridge, NJ (US)

( * ) Notice: Subject to any disclaimer, the term of this patent is extended or adjusted under 35 U.S.C. 154(b) by 343 days.

(21) Appl. No.: 12/840,151

(22) Filed: Jul. 20, 2010

(65) Prior Publication Data

US 2012/0020471 A1    Jan. 26, 2012

(51) Int. Cl.
*H04M 5/00* (2006.01)

(52) U.S. Cl.
USPC ............ 379/265.01; 379/265.02; 379/265.07; 379/266.01; 379/266.02; 379/266.03

(58) Field of Classification Search
USPC ........................................ 379/265.01–266.04
See application file for complete search history.

(56) References Cited

U.S. PATENT DOCUMENTS

| | | | | |
|---|---|---|---|---|
| 7,756,263 | B1 * | 7/2010 | Thenthiruperai | 379/265.07 |
| 8,204,205 | B1 * | 6/2012 | Blanchard et al. | 379/265.01 |
| 2004/0010582 | A1 * | 1/2004 | Oliver | 709/224 |
| 2006/0109975 | A1 * | 5/2006 | Judkins et al. | 379/265.02 |
| 2006/0115070 | A1 * | 6/2006 | Bushey et al. | 379/265.02 |
| 2007/0043571 | A1 * | 2/2007 | Michelini et al. | 704/270.1 |
| 2010/0220842 | A1 * | 9/2010 | Thenthiruperai | 379/88.04 |
| 2011/0216897 | A1 * | 9/2011 | Laredo et al. | 379/265.13 |

FOREIGN PATENT DOCUMENTS

WO     2004017584     2/2004

OTHER PUBLICATIONS

Genesys. "Increase Customer Loyalty and Reduce Contact Center Costs with Proactive Contact." Published online at [http://www.genesyslab.com/system/files/Increase%20Customer%20Loyalty%20and%20Reduce%20Costs%20with%20Proactive%20Contact.pdf], retrieved Jul. 9, 2010. Genesys Telecommunications Laboratories, Inc., Daly City, California, Aug. 2007, 19 pages.

* cited by examiner

*Primary Examiner* — Joseph J Nguyen
(74) *Attorney, Agent, or Firm* — Turocy & Watson, LLP

(57) ABSTRACT

Systems and methods that employ contact escalation periods as criterion for managing routing procedures of a contact center. A prediction component can predict when a customer is likely to escalate a contact that is forwarded to a contact center, and hence facilitate resource matching based on such prediction. Accordingly, proactive and anticipatory contact interaction is enabled, wherein routing of contacts occur in-part based on predicted likelihood of escalations.

20 Claims, 11 Drawing Sheets

ROUTING OF CONTACTS BASED ON PREDICTED ESCALATION TIME

BACKGROUND

The Internet and multimedia applications are becoming increasingly popular across the world, and there exists a significant momentum for industry to build and deploy efficient Internet-based contact centers. In general, a contact center (also known as a call center or customer interaction center) is a centralized office, which operates as part of an organization's customer relationship management (CRM). For example, the contact center can receive and transmit large volume of requests via various communication channels (e.g., telephone, fax, live chat, e-mail, letter, and the like.) The contact center can further administer incoming product support or information inquiries from clients or users, for example. Likewise, outgoing calls for telemarketing, client issues, product services, and the like can also be administered by the contact center.

Accordingly, a contact center represents a central point for an organization from which customer contacts can be managed. The contact center can consist of a number of human agents, wherein each agent is assigned to a telecommunication device (e.g., a phone or a computer for conducting email or Internet chat sessions)—which is connected to a central switch. Such devices enable agents to provide sales, customer service, or technical support to existing customers or prospects. The contact center can be independently operated or networked with additional centers, and is often linked to a corporate computer network. Voice and data pathways into such centers can further be linked through technologies such as computer telephony integration (CTI).

To this end, contact centers enable routing of company information to customers, while tracking their information for accumulation of marketing data. Moreover, various enterprises employ contact centers for servicing internal functions. Such can include help desks, retail financial support, sales support, and the like. In general, contact centers can establish "preferred" channels of contacts, for different types of inquiries. Such preferences can typically be based on costs associated with handling each type of contact. For example, for contacts such as product service inquiries that typically do not generate revenue, web based support portal(s) can be designated as the preferred channel. Likewise, for contacts related to purchase of products, the preferred channel can be a live human contact center agent via voice—which enables an opportunity to "up sell" the caller with more profitable products/services. Such designations of preferred channels do not necessarily indicate that specific types of service are only available on these specific channels. Rather, the designations merely represent that the businesses have established preferences based on balancing costs and revenues, with respect to pairing the services with contact designations.

Contact centers that respond to incoming contacts are typically referred to as "inbound contact centers", and contact centers that engage in outgoing contacts are referred to as "outbound contact centers." For example, in an outbound contact center contacts can occur to encourage sales of a product, provide technical support or supply billing information, survey consumer preferences, and the like. In both cases of inbound and outbound, a contact center operation can include a switch system that connects callers to agents.

In an inbound contact center, such switches route incoming callers to a particular agent in a contact center—or alternatively—if multiple contact centers are deployed, to a particular contact center for further routing. Likewise, in an outbound contact center that employs telephone devices, dialers are typically employed in addition to a switch system. The dialer can automatically dial a phone number from a list of phone numbers, and further determine whether a live person has actually been reached (as opposed to reaching an answering machine). Subsequently, and when the dialer obtains a live caller, the switch system routes the caller to a particular agent in the contact center.

To this end, routing technologies have been developed to optimize caller experience. For example, a telephone system can equalize caller waiting times across multiple telephone switches, regardless of general variations in performance that can exist among those switches.

Typically, the contact center can set up a queue of incoming callers and preferentially route longest-waiting callers to agents that become available periodically. Such pattern of routing contacts to either the first available agent (or the longest-waiting agent) is referred to as "round-robin" contact routing. In general, attempts have been made to improve upon such standards.

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

Various aspects of the subject innovation predict when a customer is likely to escalate a contact received by a contact center, and employ such prediction for contact escalation as part of managing routing procedures (e.g., resource matching) for the contact center. As such, the predicted contact escalation period can be considered as an additional criteria in creating models (e.g., queuing models, Markov chains) for resource matching of the contact center (e.g., models that can be built across inputs received by customers of the contact center.) Hence, proactive and anticipatory contact interaction is enabled, wherein inbound or incoming contact prioritization can occur in-part based on predicted time for likelihood of contact escalation.

In one aspect, a prediction component can initially predict likelihood for a contact escalation from a less expensive resource usage of the contact center, to a more expensive resource thereof. Subsequently, and based on such likelihood of escalation, priorities can then be satisfied, to avoid or mitigate actual occurrence of the contact escalation. Moreover, the prediction component can predict time period(s) associated with the likelihood of escalation, in part based on contextual data such as: 1) subject matter of the contact; 2) character traits/behavior of the specific customer or user who initiates such contact (when available) or based on demographic model when prior behavior for a specific individual is not available; 3) contact environment (e.g., type of channel employed, location), and the like. The contextual data can further be supplied by data banks, such as data mined by third parties, for example.

Moreover, the subject innovation can be employed as part of monitoring a social network arrangement—wherein subject matter of a contact is initially presented to the social network (e.g., peer-to-peer group), and before the customer actually forwards such contact to the contact center. By monitoring such social network, the prediction component can further consider possible transfer of the contact from the social network to the contact center, as part of predicting the likelihood for contact escalation.

In a related aspect, predicted escalation periods can be dynamically updated in real-time, while the contact is being processed by the contact center. For example, if escalation becomes substantially likely or inevitable—(e.g., due to lack of resources to be deployed to manage the contact)—remedial measures that can change predicted escalation periods can be taken in an attempt to appease the customer. In one aspect, the remedial measures can represent procedures that can persuade the contact to maintain a current contact channel and hence not escalate. Likewise, rewards or other procedures can be employed (e.g., on all channels), which can be deemed indicative that progress is made (e.g., a voice that states "your call is important to us, please stay on the line.") Hence, predicted contact escalation periods can be dynamically updated in real-time.

According to a further aspect, the prediction component can further assign threshold values in form of probability functions, to the contact—for anticipating a likelihood of when an escalation for such contact can in fact occur. Hence, workforce management can be efficiently customized to facilitate required staffing/agent surplus, by mitigating contact escalation (e.g., employing fewer resources that are more costly, than the resources employed prior to contact escalation.) The prediction component can further facilitate supplying a response, which occurs prior to expiration of a time period(s) that is associated with such likelihood of contact escalation.

In accordance with a methodology of the subject innovation, initially feature extraction can be performed on a contact received by the contact center—wherein information associated with the contact, such as topic of request, customer information and the like can be obtained. Such information extracted from the contact can be represented in form of vectors for interaction with a model that probabilistically predicts contact escalation point (e.g., training of a Markov model). A customer history can further be created, wherein the Markov model can then be employed to compute a likelihood of contact escalation—(e.g., percentage chance that a customer will follow up on the initial request through another channel, and/or on same channel with different destination) that is considered to be more expensive than the original channel, from standpoint of the contact center)—as a function of character traits of customer, or cost of resources associated with the contact center.

The following description and the annexed drawings set forth in detail certain illustrative aspects of the claimed subject matter. These aspects are indicative, however, of but a few of the various ways in which the principles of such matter may be employed and the claimed subject matter is intended to include all such aspects and their equivalents. Other advantages and novel features will become apparent from the following detailed description when considered in conjunction with the drawings.

DETAILED DESCRIPTION

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
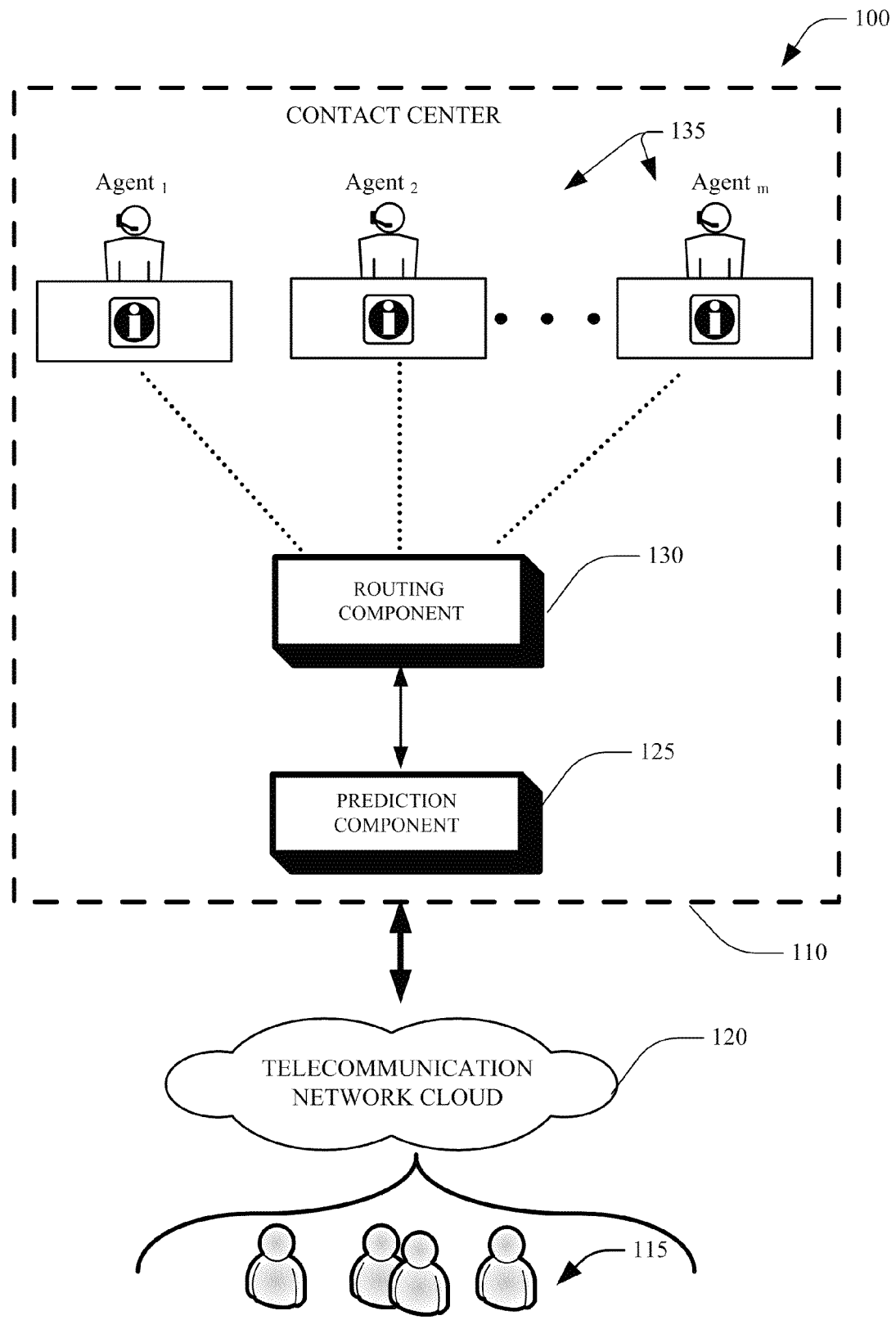
FIG. 1 illustrates a block diagram of an exemplary system that predicts when a customer is likely to escalate a contact that is forwarded to a contact center, in accordance with an aspect of the subject innovation.

FIG. 1 illustrates an exemplary communication system 100 that can predict when a customer 115 is likely to escalate a contact, and further employ such escalation prediction as part of managing routing procedures (e.g., resource matching) for the contact center 110. As illustrated, the telecommunication network cloud 120 can represent a public or semi-public space on transmission lines that exists between end points of a transmission. Data that is transmitted across a WAN can enter such network from one end point using a standard protocol—wherein the data can then share space with other data transmissions while entering the telecommunication network cloud 120, for example. Moreover, when emerging from the telecommunication network cloud 120—such data can be encapsulated, translated and transported in various ways—including remaining in the same format as when it entered the telecommunication network cloud 120. Accordingly, the telecommunication network cloud 120 can represent an unpredictable space that the data enters before it is received (e.g., typically no two packets will necessarily follow the same physical path, when data is transmitted in a packet across a packet-switched network.) In this regard, the telecommunication network cloud 120 can include Public Switched Telephone Network, the Internet, Private data network, a satellite network, and the like.

Moreover, the telecommunication network cloud 120 can include a single contact address, (e.g., a telephone number or email address), or multiple contract addresses, for example. Furthermore, the routing component 130 can represent contact routing hardware and/or software that are designed to facilitate routing contacts in the contact center 110. As such, the routing component 130 can route a contact to an agent 135 (1 to m, where m is an integer) of the contact center 110. Even though the routing component 130 is illustrated as being separate from the prediction component 125, is to be appreciated that other configurations are well within the realm of the subject innovation.

Customer 115 can represent an individual or entity that interacts with an enterprise via the contact center 110, for obtaining information using any of a variety of platforms or communication channels, such as telephone, e-mail, text based communication (e.g., text messaging, on-line information exchange, instant messaging, short message service) and the like. The contact center 110 can be implemented as part of hardware and/or software (e.g., for receiving a call from customer/caller 115, communicating with caller 115, coordinating communication with caller 115 and call-center agents 135, and the like.) Furthermore, each call-center agent 135 can be assigned a different queue of callers to be processed—wherein the amount of time can be estimated for talking to an agent, and subsequently supplied to each caller.

As illustrated, the prediction component 125 can initially predict likelihood for escalation of a contact (e.g., from a less expensive resource to a more expensive resource of the contact center.) Subsequently, and based on such likelihood of escalation, priorities can then be satisfied, in an attempt to avoid or mitigate actual occurrence of the escalation. As such, the predicted escalation period can be considered as an additional criteria in creating models for resource matching of the contact center 110 (e.g., models that can be built across inputs received by customers of the contact center.) Hence, proactive and anticipatory contact interaction is enabled, wherein inbound contact prioritization can occur in-part based on predicted time for likelihood of escalation.

Figure 2:
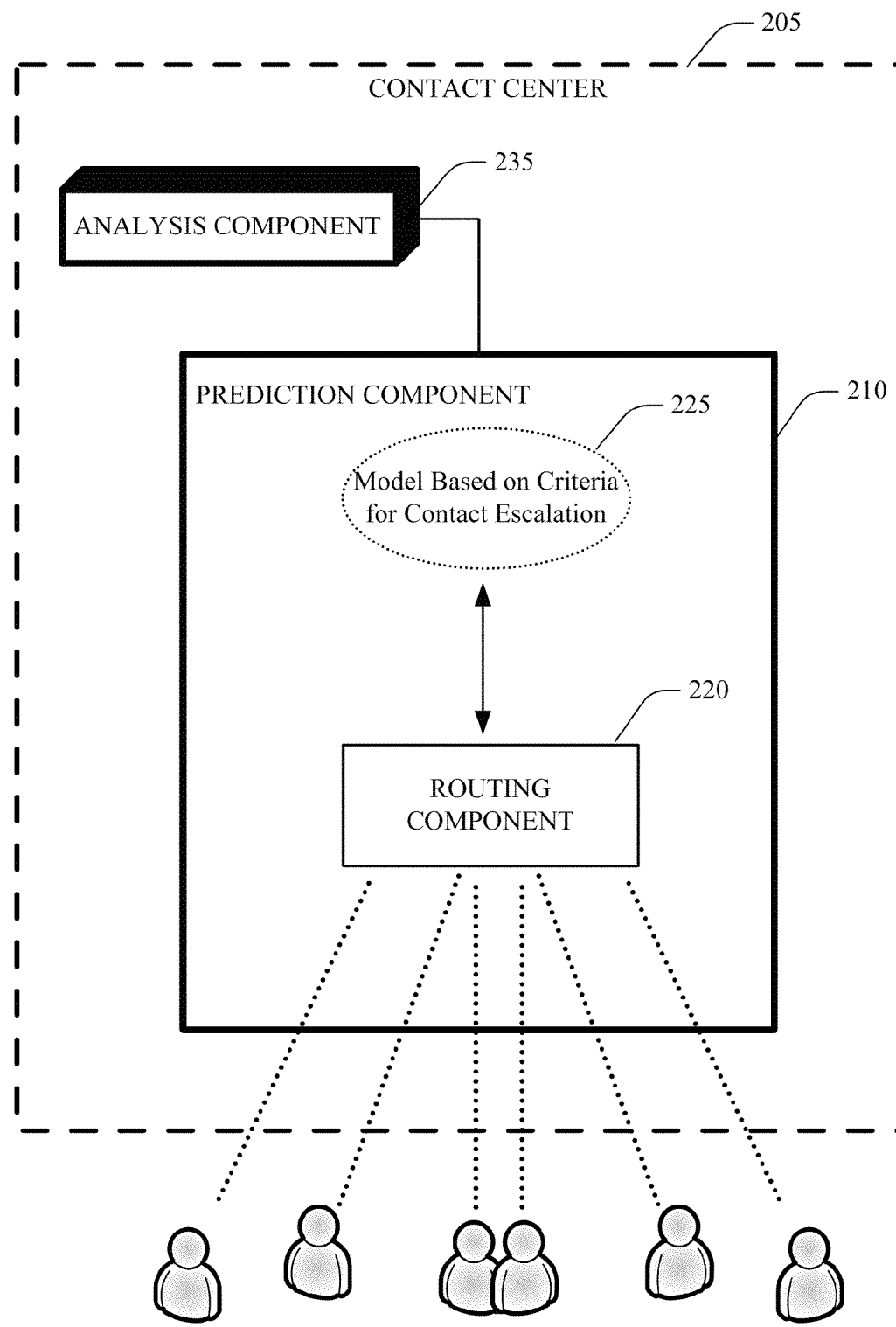
FIG. 2 illustrates a particular prediction component that employs the escalation prediction as part of managing routing procedures (e.g., resource matching) for the contact center, according to an aspect of the subject innovation.

FIG. 2 illustrates a particular prediction component 210 that includes the routing component 220 as part of managing routing procedures (e.g., resource matching) for the contact center, according to an exemplary aspect of the subject innovation. The routing component 220 can apply various models to route contacts of the contact center, wherein such models can employ criteria such as; amount of time before a caller can communicate with call-center agent, a satisfaction rating; areas of expertise of call-center agent; the primary language spoken; location of call-center; and the like, for example. To this end, the subject innovation introduces the contact escalation period as an additional criteria in creating model(s) 225 for resource matching of the contact center (e.g., as part of models that can be built across inputs received by customers of the contact center.)

As explained earlier, the routing component 220 can further employ additional models based on other criteria such as agent grade data, (e.g., data associated with agent performance for a particular desired performance); ranking or scoring a set of agents based on performance for a particular outcome (e.g., revenue generation, cost, customer satisfaction, or a combination thereof); and other preferential criteria such as routing callers to agents based on a performance ranking or score, for example. Hence, the routing component 220 can receive agent grades or agent history data and output one or more rankings of agents based on one or more desired outcome variables.

In a related aspect, in addition to the criteria of contact escalation, the routing component 220 can include one or more pattern matching algorithms, which can operate to compare agent data associated with a set of callers-to-agent data associated with a set of agents and determine a suitability score of each caller-agent pair. For example, the routing component 220 can receive caller data and agent data from various databases and output caller-agent pair scores or a ranking of caller-agent pairs. As explained earlier, such pattern matching can further employ the predicted likelihood for escalation of a contact, from a less expensive resource to a more expensive resource of the contact center. Subsequently, and based on such likelihood of escalation, priorities can be satisfied and patterns matched, to avoid or mitigate actual occurrence of the escalation. It is to be appreciated that such pattern matching algorithm can employ various neural network algorithms, or adaptive algorithms. affinity matching algorithms and the like—wherein different matching engines can be employed with different pattern matching algorithms operating on the same or different input data, to maximize different output variables; such as maximizing customer satisfaction, for example.

It is to be appreciated that escalation of a contact by a customer, is based on criteria that is typically personal to such customer—(e.g., subjective criteria that can change from user to user such as; customer satisfaction; customer goals, and the like.) Thus, an escalation of contact does not necessarily represent an increase in "severity" of issues faced by such customer. For example, severity can be increased via an increase in specific down production, or adverse impact on mission critical applications of an entity. Yet, such entity as a customer can escalate contact and demand immediate attention without necessarily experiencing such increased severity issues. Stated differently, customers can escalate any contact, for any level of severity, at any time.

In contrast, actual occurrence of the contact escalation can be objectively defined via a cost function for resources of the contact center 205. For example, contact escalation and/or follow-up can result from: 1) a user attempting to reach the contact center on an additional channel, which is deemed more expensive than the channel originally employed for the contact; and/or 2) the user attempting to reach an additional destination on the same channel, yet the additional destination being deemed a more expensive resource than the destination originally intended (e.g., attempt to speak with the owner of the company, as opposed to a company representative with a lower rank/associated hourly cost.) Stated differently, escalation of a contact and/or follow up corresponds to an increased cost of the resource utilized, to resolve issues, or manage/respond to the contact (e.g., "same issue other channel", or "same issue same channel different destination.") For example, from standpoint of a contact center with multi-tiered cross-channeled communications, an attempt to follow up on a contact via a real-time telephone call to a live agent can be deemed more expensive than an e-mail request via the Internet. Likewise, sending an email to a specific manager e-mail box can cause more expensive resources to be utilized for creating a response—then sending an e-mail to the general email box. As such, the escalation can be represented by abandonment of an initial request—in favor of—an additional request, which requires a resource of the contact center that is more expensive than a resource required by the initial request.

To this end, the analysis component 235 can provide a value function that evaluates resources of the contact center—while also performing cost-benefit analysis for matching contacts to such resources based on likelihood of contact escalations. This data can then be presented to the contact center 205, to determine which contact from which customer should be fulfilled.

The analysis component can continue to compute a value of fulfilling a contact k (e.g., utility of resolving issue about contact k) by analyzing a difference between a value of such contact fulfillment, versus not resolving contact k within the context. For instance, given the value of various resources of the contact center, the analysis component can evaluate:

Value of fulfilling contact $k$=Utility(fulfilling contact $(k)$)−Utility(not fulfilling contact$(k)$)

Such can further be considered in terms of a threshold value, as represented by:

Utility(fulfilling$(k)$|context cost of resources)>threshold value.

Such threshold value can be predetermined by the contact center 205, to facilitate the cost-benefit analysis. An example of the threshold rule can include "Choose contact with 90% likelihood of escalation from customer A, over contact with 10% likelihood of escalation from Customer B."

Figure 3:
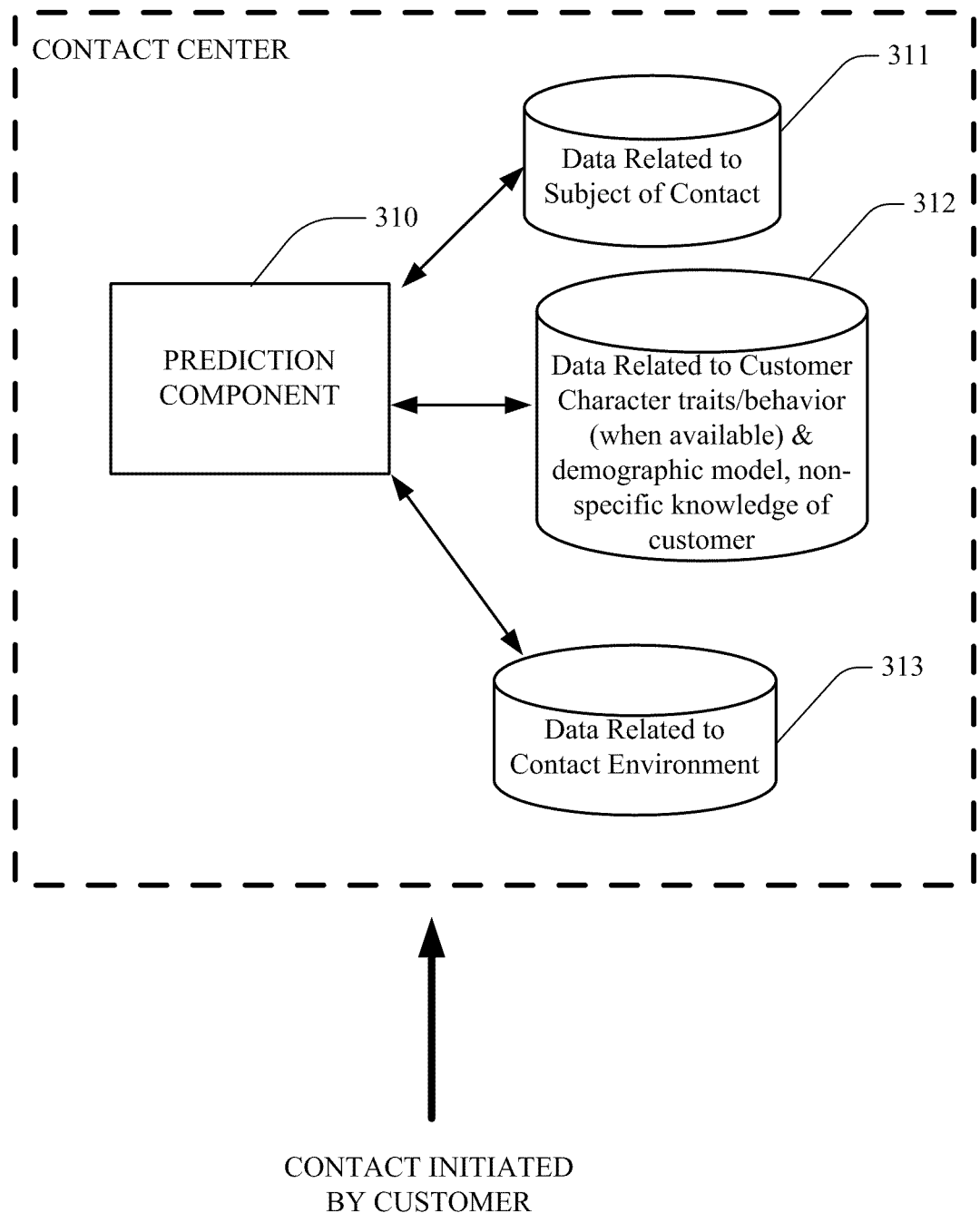
FIG. 3 illustrates a further exemplary aspect of a prediction component, in accordance with an aspect of the subject innovation.

FIG. 3 illustrates a further exemplary aspect of a prediction component 310 that can predict time period(s) associated with the likelihood of escalation, in part based on contextual data such as: 1) subject matter of the contact; 2) character traits/behavior of the customer who initiates such contact, 3) contact environment (e.g., type of channel employed, location), and the like. The contextual data can further be supplied by data banks, such as data mined by third parties—wherein various models such as: queuing models, Markov sources, probabilistic functions of Markov chains, and the like—can subsequently perform probabilistic predictions based upon the collected history. For example, if prior contacts exist with a customer/user—the subject innovation can model their specific behavior. Otherwise, a demographic model that represents the behavior modeled as an average of previous contacts from similar individuals can be employed. In one aspect, the actual decision for which model to employ, can initially be based on a weighted average of the specific and demographic information—and subsequently modified when sufficient data is accumulated on the specific behavior, to obtain its accurate model.

Moreover, different pieces of information, such as collected history for contact escalation, feasibility/cost criteria for a contact center, probabilistic/stochastic models; operating instructions, and the like can also be maintained in the data storage systems 311, 312, 313. Such data storage systems can be a complex model based database structure, wherein an item, a sub-item, a property, and a relationship can be defined to allow representation of information within a data storage system, for example. The data storage systems can further employ a set of basic building blocks for creating and managing rich, persisted objects and links between objects—wherein an item can be defined as the smallest unit of consistency within the data storage system, which can be independently secured, serialized, synchronized, copied, backup/restored, for example.

As explained earlier, contact escalation periods can be employed as a performance measure as part of a model that predicts and/or approximate queuing scenarios based on mathematical analysis and/or stochastic procedures. By analyzing of the relevant queuing model, cause of possible response delays or problems can be identified and impact of proposed changes assessed. For example, different time periods for a contact escalation can be assigned various likelihood percentages—based on how probable a user is to escalate a contact after expiration of such predetermined time periods. Specifically, training can occur through an $n^{th}$-order Markov model (where n is an integer) to probabilistically predict likelihood of contact escalations based on a short sequence of accumulated episodes of prior contact escalations, for example. It is to be appreciated that any type of history that pertains to profiling character traits associated with escalating a contact (e.g., demographic, psychographic; behavioral information such as: level of customer patience, satisfaction, tolerance; age, gender, wealth index, interests, shopping habits, and the like) can be employed as part of predicting the contact escalation.

The following discussion is an example for a Markov model that can be employed in conjunction with aspects disclosed herein. It is to be appreciated that such discussion is exemplary in nature, and various deviations can occur from the particular model information. Prediction of a contact escalation period for a particular client or user of the contact center can be based on its past history, wherein a model for sequence of contact escalation periods can be designated as $x_i$ wherein i represents a continuous time variable. It is further to be appreciated that if the model is further simplified, i can alternatively represent a discrete time variable. For example, considering an interval of t=3 minute time frames from call initiation, wherein continuous time variables can be represented as $0 < x_1 \leq 3$ minutes, $3 < x_2 \leq 6$ minutes; $6 < x_3 \leq 9$ minutes, and the like. Such model can further be simplified by defining discrete time points with jump discontinuities from call initiation, such as $x_1$=3 minutes; $x_2$=6 minutes; $x_3$=9 minutes; and the like.

Hence, $x_i$ can represent a time period after call initiation by a particular customer, and $P[x_i]$ designates the likelihood of escalation during (or for) such time period. Accordingly, for each customer, whenever a prediction is performed, respective time/period evaluated for contact escalation can be denoted as $\{x_0, x_1, x_2, \ldots x_{max}\}$, where $x_0$ is the time at initiation of the call, and $x_{max}$ represents a predefined time period for the contact center that the model no longer responds to the call, and instead implements other actions such as appeasing the customer. Hence, depending on whether the model employs a continuous probability distribution based on time as a continuous random variable, or alternatively, is simplified as a discrete probability distribution; the probability of contact escalation can be represented by: $P[x_i]=P[x_{i-1} < x \leq x_i]$—and predicted for; or during such time periods.

Based on such model, a probability distribution can be obtained wherein the horizontal axis represents discrete time points and the vertical axis is the contact escalation likelihood. Associated histograms can be built, and subsequently normalized to obtain a discrete or continuous probability distribution. Moreover, various statistical values such as mean values and standard deviation can subsequently be computed. It is to be appreciated that parameters can further be defined based on second order models $x_{ij}$, which can be sensitive to an additional element, such as particular channel information for a contact. Thus, models can be built across inputs received by customers of the contact center, wherein the predicted escalation period can be considered as an additional criterion for resource matching, which enable proactive/anticipatory contact routing.

Figure 4:
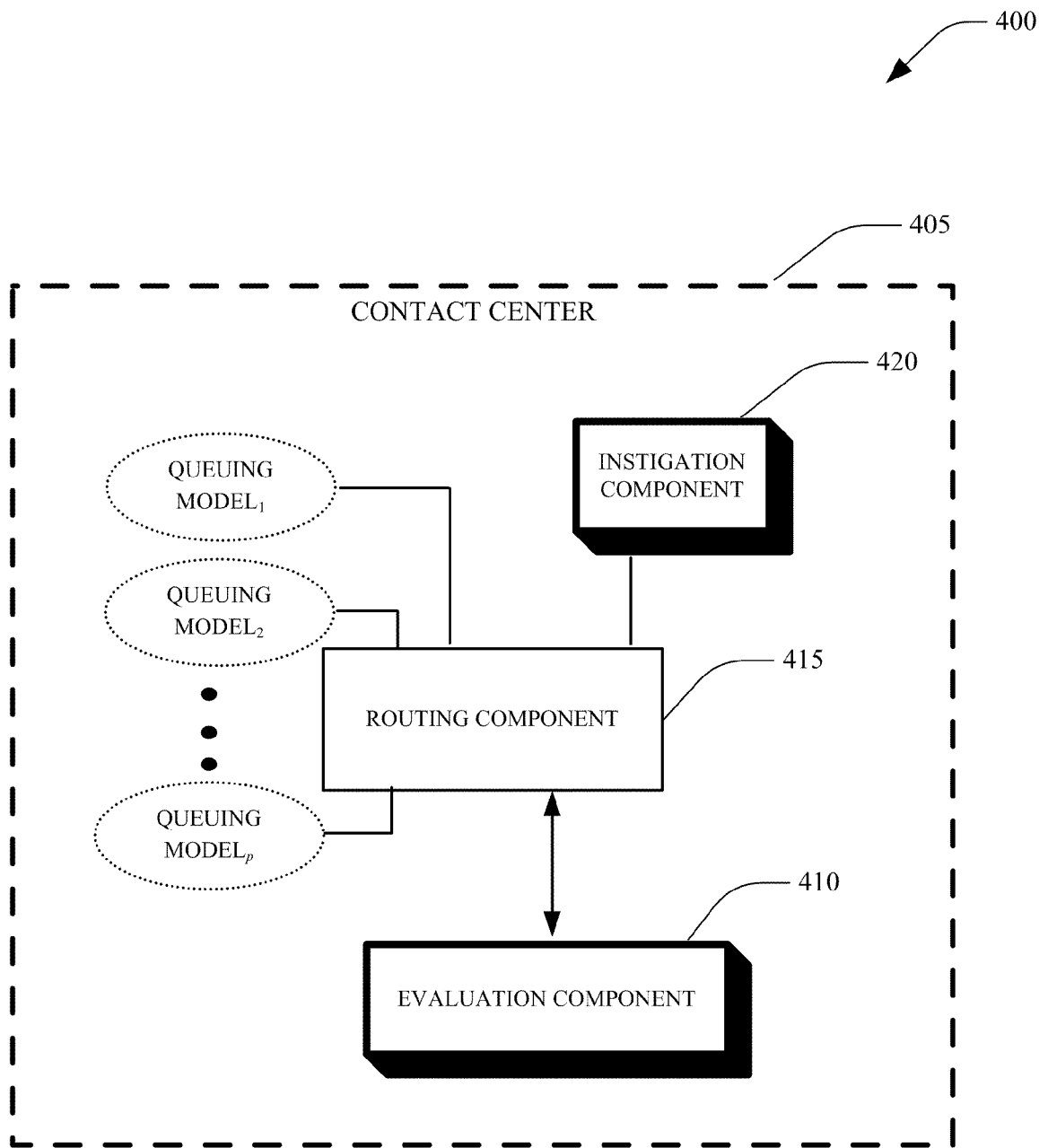
FIG. 4 illustrates an evaluation component in conjunction with queuing models that can employ contact escalation periods as part of routing procedures.

FIG. 4 illustrates a particular system 400 that further employs an evaluation component 410 in conjunction with a queuing model(s) (1 thru p, p being an integer), which can employ contact escalation periods as part of routing procedures (e.g., prioritization). A customer/user history can be collected and evaluated by the evaluation component 410, which analyzes history data regarding contact escalation. Moreover, a communication module (not shown) can further be employed by the evaluation component 410 to engage with other devices/components, such as for information exchange with the routing component 415, for example. Accordingly, likelihood percentages for contact escalation can be used to perform a variety of tasks, such as satisfying priorities, matching customers to contacts, and the like. A result of the evaluation and a Markov Model can further be employed by the evaluation component, to compute likelihood for contact escalation (e.g., percentage chance that a user escalates a contact from a less expensive resource to a more expensive resource of the contact center 405.)

Moreover, additional data can be collected that relate to comparing; the costs of contacts actually escalating—versus—the costs of adding extra resources to handle the contacts for such class. For example, when a substantial number of e-mail service requests are received by the contact center, the model can estimate that 50% of such received e-mails will escalate with the existing available set of resources. Accordingly, an estimated additional cost of "A" unit prices (arising from the escalation) is expected. Such additional cost of "A" unit prices, can then be compared to the cost of adding additional contact center agent resources to the e-mail pool, having a cost of "B" unit prices—and yet which can reduce the escalation percentage of received e-mails to 5%, for example. As such, if A is larger than B (plus the escalation cost of the 5%), then it is cost beneficial for the contact center to add such resources at the cost of "B" unit prices.

As illustrated, an instigation component 420 can further determine when the routing component 415 is to employ models for likelihood of contact escalation, based on various predetermined configurations (e.g., routing thresholds, sufficiency of accumulated history data). For example, the routing component 415 can initiate operation upon encountering contacts from particular customers, or when traffic of calls to the contact center 405 surpasses a pre-set number of contacts. Moreover, customer history related to contact escalation can be retained in a separate location, and thus a search component (not shown) can locate such contact escalation history. The search component can employ a plurality of search criteria such as data related to: customer identification, contact type, channel employed, and the like.

Accordingly, different route matching and/or prioritizing outcomes for contacts forwarded to the contact center 405 can occur, based in part on the escalation likelihood. For example, a likelihood of escalation can be predicted (e.g., simulated) for a customer with a history of contacts to a contact center, wherein if response to an e-mail of such user is delayed for 22 hrs—the probability of contact escalation is determined to be 80%. As such, the contact center 405 can determine if resources should be matched to the customer before expiration of the 22 hrs time period—to mitigate such likelihood of contact escalation. To this end, these likelihoods can be used in conjunction with different functionalities, and different outcomes can take place regarding choice of the contact escalation.

Moreover, if an outcome has a likelihood over a specific threshold, a check can subsequently be performed to verify if risks exist that should be considered when routing contacts and allocating resources. Management of the contact center can hence be monitored to reach desired outcomes based on prediction of contact escalation.

Figure 5:
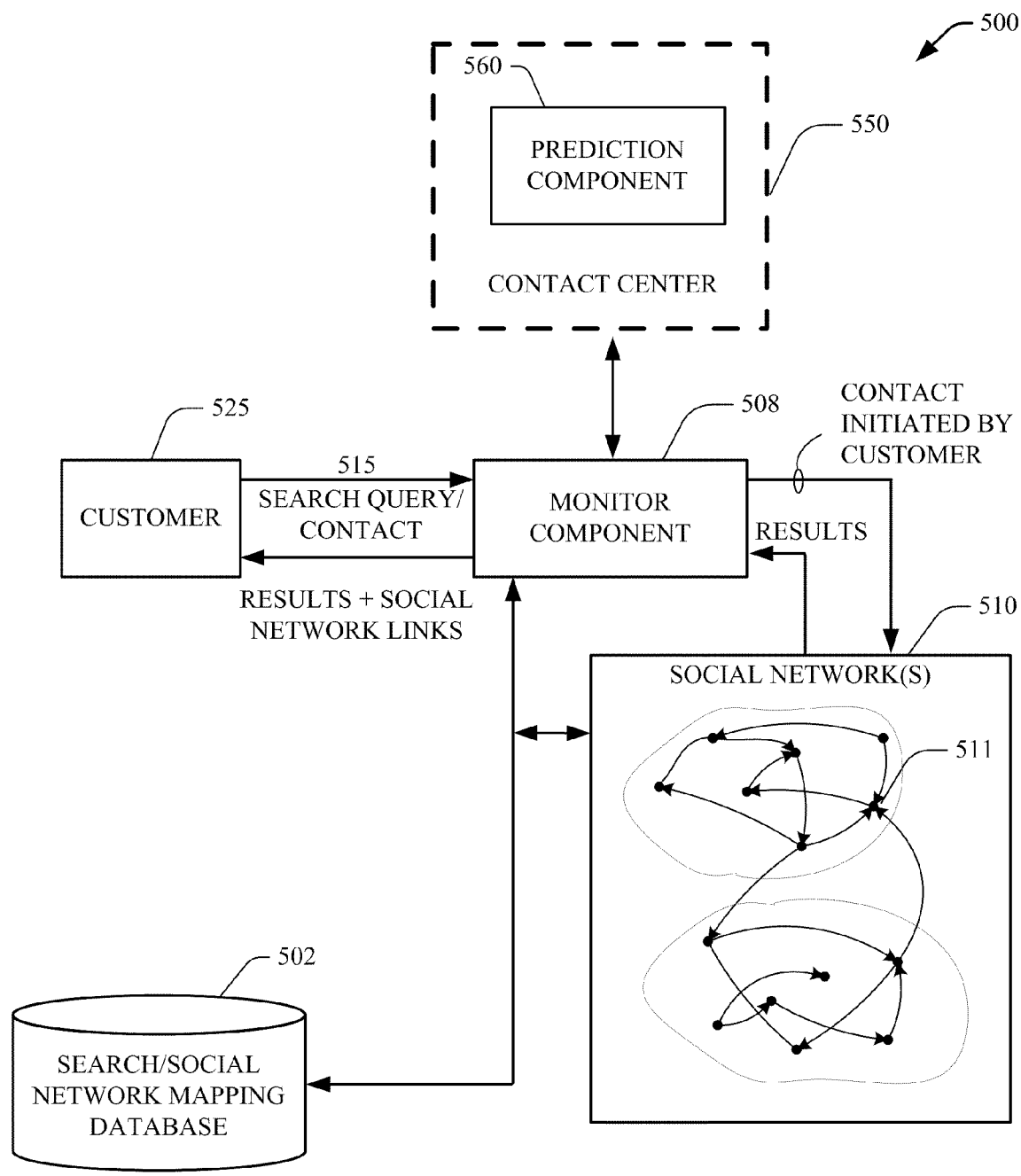
FIG. 5 illustrates another aspect of the subject innovation that can be employed as part of monitoring social network arrangements.

FIG. 5 illustrates another aspect of the subject innovation that can be employed as part of monitoring a social network 510. Generally, the social network 510 can be described as a structure of nodes 511 that represent individuals or groups of individuals (e.g., organizations). Social networking can also refer to a category of network applications that facilitate connecting friends, business partners, or other entities or groups of entities together. In one aspect, the contact 515 can be initially presented to the social network 510 (e.g., a peer-to-peer group) and prior to the customer 525 actually forwarding such contact to the contact center 550. The social network 510 can enhance searches via endorsements by other entities (e.g., individual or groups of individuals) of the network, and/or can be maintained by business entities that are associated with the contact center 550. Accordingly and by monitoring the social network 510, the prediction component 560 can further consider transfer of the contact from the social network 510 to the contact center, as part of predicting the possibility for escalation.

As illustrated in FIG. 5, the system 500 can monitor interaction data and search queries, presented by a customer as well as the query results, which are supplied by other members of such social network 510. The system 500 can include database 502 that stores mapping information that maps customer/user interaction information (e.g., search-related information) to an entity of the social network 510. The mapping information can be continuously updated and reorganized as links within the system mapping become stronger or weaker.

A monitor component 508 (which can include a search engine for searching queries) can monitor search queries submitted by the customer 525, and determine if such queries have been satisfactorily responded to. If not, the prediction component 560 of the contact center 550 can predict likelihood that such search query will be escalated to a contact with the contact center 550 in the future. By predicting when the customer 525 is likely to escalate a contact from the social network 510 to the contact center 550, anticipatory resource management can be initiated to obtain optimum results.

Figure 6:
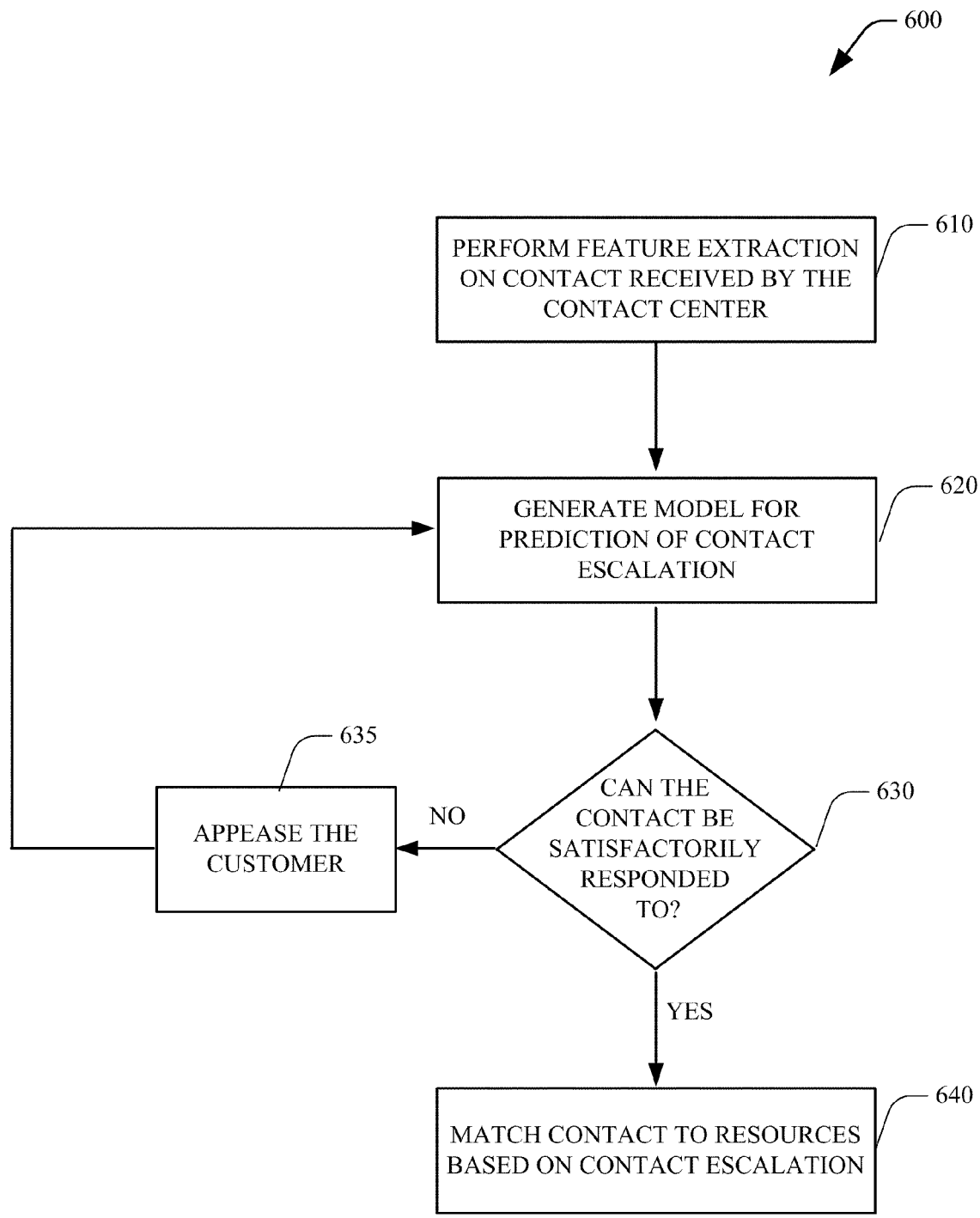
FIG. 6 illustrates methodology of predicting when a customer is likely to escalate a contact, in accordance with an aspect of the subject innovation.

FIG. 6 illustrates a related methodology 600 of predicting when a customer is likely to escalate a contact that is forwarded to a contact center, and employ such escalation prediction as part of managing routing procedures (e.g., resource matching) for the contact center. While this exemplary method is illustrated and described herein as a series of blocks representative of various events and/or acts, the subject innovation is not limited by the illustrated ordering of such blocks. For instance, some acts or events may occur in different orders and/or concurrently with other acts or events, apart from the ordering illustrated herein, in accordance with the invention. In addition, not all illustrated blocks, events or acts, may be required to implement a methodology in accordance with the subject innovation. Moreover, it will be appreciated that the exemplary method and other methods according to the innovation may be implemented in association with the method illustrated and described herein, as well as in association with other systems and apparatus not illustrated or described.

Initially and at 610 feature extraction can be performed on a contact received by the contact center. The feature extraction can obtain data that is associated with the contact, such as topic of request, customer information and the like. Such information extracted from the contact can be represented in form of vectors for interaction with a model, generated at 620 that probabilistically predicts escalation point (e.g., training of a Markov model). A customer history can further be created or updated, wherein the Markov model can then compute an escalation likelihood—(e.g., percentage chance that a customer will follow-up on the initial request through another channel that is considered to be more expensive from standpoint of the contact center)—as a function of character traits of customer, or cost of resources associated with the contact center. For example, based upon user history, a Markov model can be used to determine how likely the user is to make each decision. For instance, x % (x being a real number $0 \le x \le 100$) can be the probability of contact escalation after a duration of "t" seconds (where t is a real number.)

Subsequently and at 630, a determination is made to verify whether a contact received by the contact center can be satisfactorily responded to (e.g., prior to expiration of the escalation period). If not, by engaging in activities that appease or console the customer at 635—the methodology 600 mitigates or avoids contact escalation. Such activities can include, supplying an incentive in exchange for the customer agreeing to prolong the escalation period for a predetermined period of time. Otherwise, and by act 640 the contact received by the contact center can be routed based on pattern matching that employ the predicted likelihood for escalation of a contact. Subsequently, and based on such likelihood of escalation, priorities can be satisfied and patterns matched, to avoid or mitigate actual occurrence of the escalation.

Figure 7:
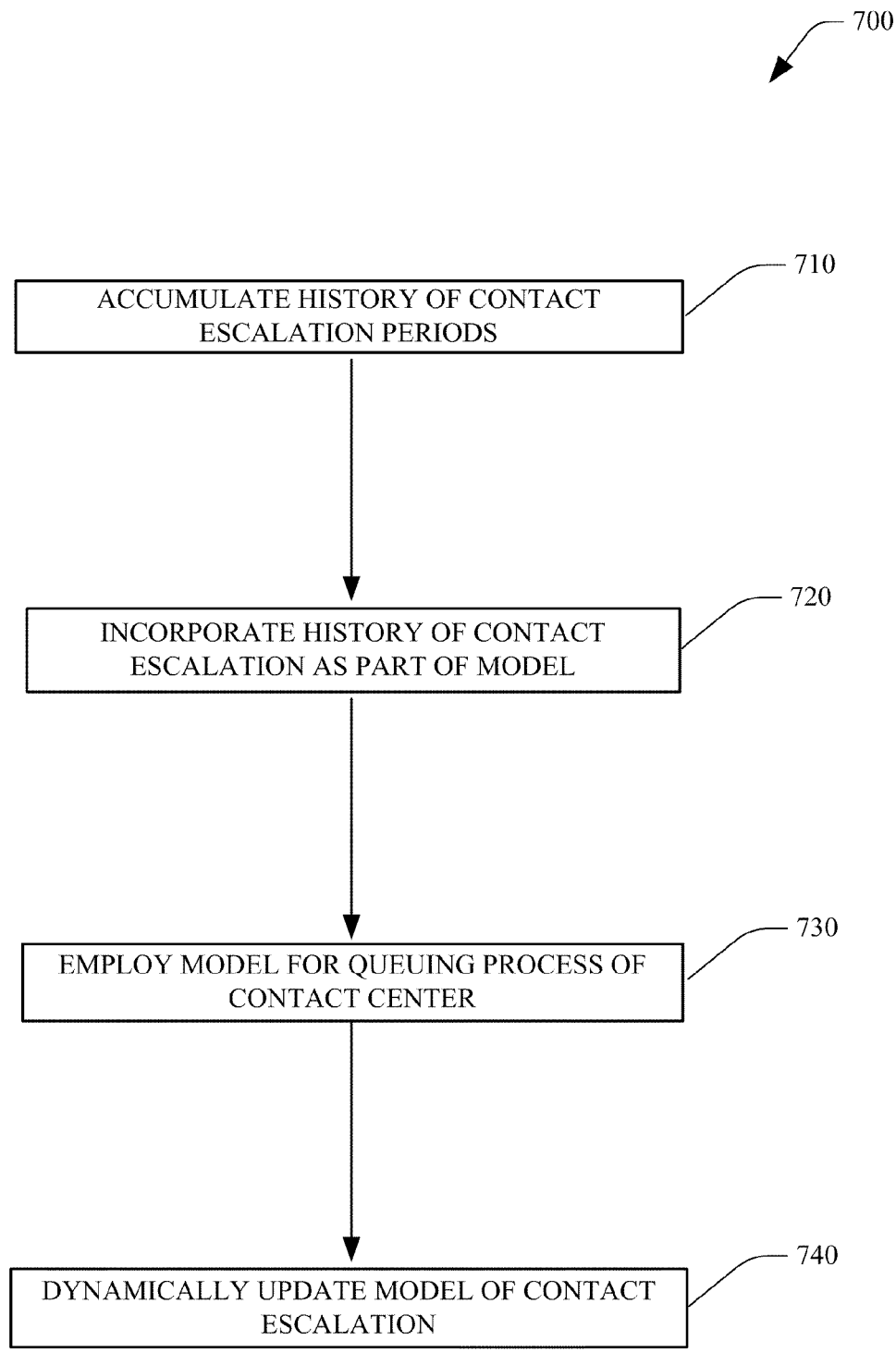
FIG. 7 illustrates a related methodology of employing contact escalation periods as part of routing management of a contact center.

FIG. 7 illustrates a related methodology 700 of employing contact escalation periods as part of routing management for a contact center. Initially and at 710, history of contact escalation periods can be accumulated based on information associated with a contact center such as, customer information, subject matter of the contact, and the like. Subsequently, and at 720 the history of escalation times can be incorporated as part of a model that facilitates prediction of contact escalation (e.g., such incorporation can relate to training of the models.) The models can subsequently be employed as part of the routing systems for the contact center at 730. As such, the contact center can route/prioritize inbound calls based at least in part on the predicted escalation periods via the model. Subsequently and at 740, the model can be dynamically updated and further trained based on new/most recent data and information obtained from the contact center.

Figure 8:
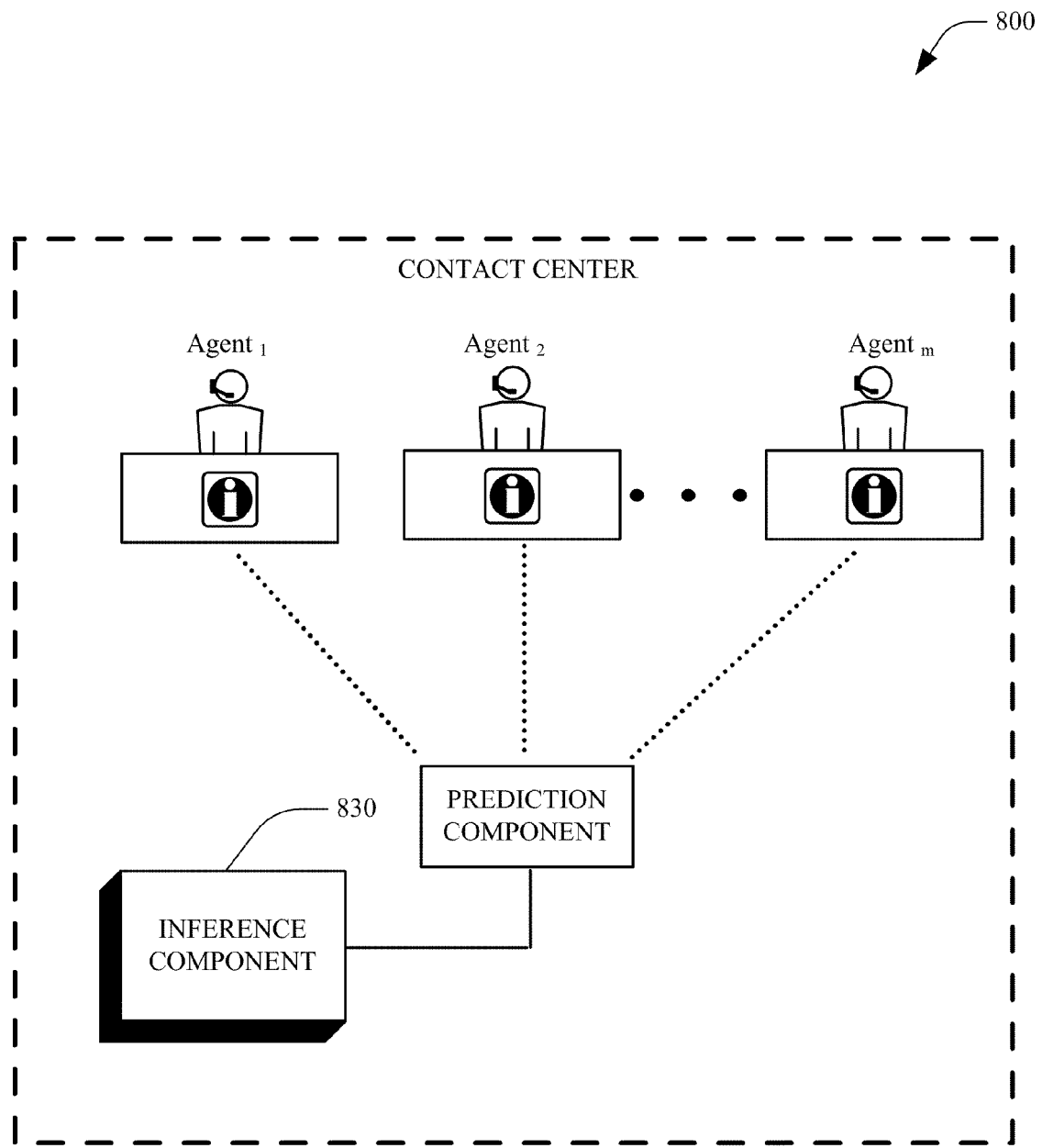
FIG. 8 illustrates an inference component that facilitates predicting when a customer is likely to escalate a contact received by a contact center, in accordance with an aspect of the subject innovation.

FIG. 8 illustrates an inference component 830 (e.g., an artificial intelligence—AI) that can facilitate inferring and/or determining when, where, how to predict contact escalation data and/or train queuing model that employ contact escalation as an additional parameter in accordance with an aspect of the subject innovation. As used herein, the term "inference" refers generally to the process of reasoning about or inferring states of the system, environment, and/or user from a set of observations as captured via events and/or data. Inference can identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

The inference component 830 can employ any of a variety of suitable AI-based schemes as described supra in connection with facilitating various aspects of the herein described invention. For example, a process for learning explicitly or implicitly how parameters are to be created for training models based on escalations of contact can be facilitated via an automatic classification system and process. Classification can employ a probabilistic and/or statistical-based analysis (e.g., factoring into the analysis utilities and costs) to prognose or infer an action that a user desires to be automatically performed. For example, a support vector machine (SVM) classifier can be employed. Other classification approaches include Bayesian networks, decision trees, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing user behavior, receiving extrinsic information) so that the classifier is used to automatically determine according to a predetermined criteria which answer to return to a question. For example, SVM's can be configured via a learning or training phase within a classifier constructor and feature selection module. A classifier is a function that maps an input attribute vector, $x=(x1, x2, x3, x4, xn)$, to a confidence that the input belongs to a class—that is, $f(x)=confidence(class)$.

In one aspect, such "training" data can include specific "abandon" events. For example, in context of a voice contact, an "abandon" event can be identified when the telephone switching equipment detects that a caller has placed the phone on hook—and hence has dropped the call. For other channels, abandon events can be determined via different methods, such as by identifying when a "new" contact by the same user, is replacing a previous (and not yet satisfied) contact by that same user. Likewise, in text chat message environments, a "session" can be maintained based on a connection that is similar to a telephone contact, and which provides a positive indication that the user has abandoned the contact attempt, for example. Accordingly, various forms of training data for abandoned events can be accumulated, which further enhance accuracy of the procedures related to the subject innovation.

Figure 9:
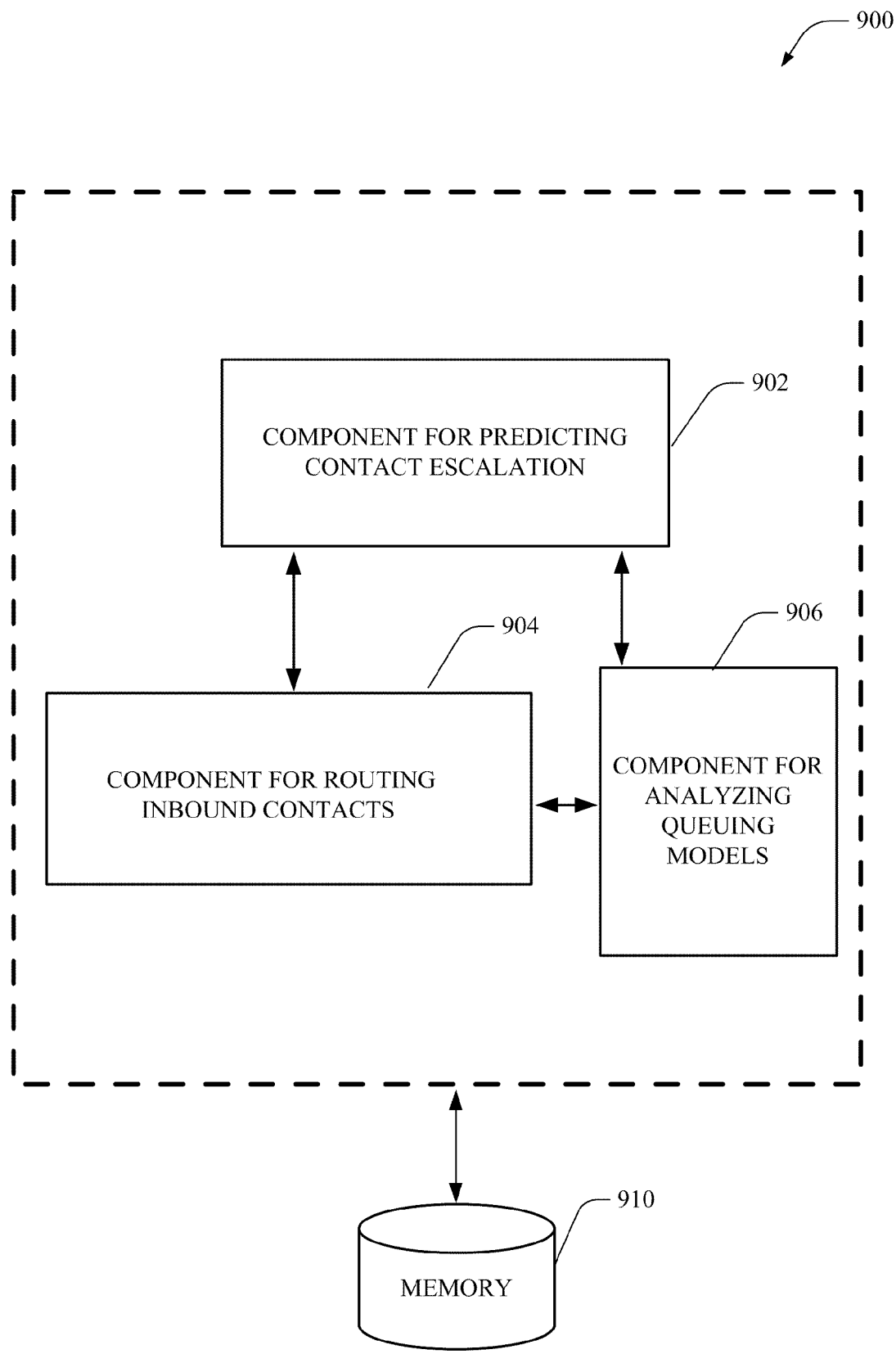
FIG. 9 illustrates a particular system for predicting when a customer is likely to escalate a contact according to an aspect of the subject innovation.

FIG. 9 illustrates a system 900 that includes a component 902 for predicting when a customer is likely to escalate a contact that is forwarded to a contact center (e.g., a logical grouping of entities that represent means for predicting contact escalation.) The system 900 further includes logical grouping of entities for routing an inbound contact based on such predicted contact escalation periods, and represented as component 904 (e.g., means for routing contacts). In addition, component 906 can represent a component for analyzing relevant queuing models, to identify cause of queuing issues and assess impact of proposed changes (e.g., means for analyzing.) The system 900 can reside partially within a contact center and/or operationally connected therewith. Moreover, the system 900 can include a memory 910 that retains instructions for executing functions associated with components 902, 904 and 906. While shown as being external to memory 910, it is to be understood that components 902, 904, 906 can exist within memory 910.

The system 900 enables contact escalation periods to be employed as a performance measure for a model that predicts and/or approximates queuing scenarios, based on mathematical analysis and/or stochastic procedures. By analyzing the relevant queuing model, potential problems related to queuing can be identified and impact of proposed changes assessed.

As used in this application, the terms "component," "module," "engine," "system," and/or functions associated therewith can be facilitated by a computer-related entity, such as hardware, firmware, software, software in execution; processor, computer readable medium; or combination thereof. For example, a component can be, but is not limited to being, a process running on a processor, a processor, an object, an executable, a thread of execution, a program, and/or a computer.

By way of illustration, both an application running on a computing device and/or the computing device itself can represent a component. One or more components can reside within a process and/or thread of execution and a component can be localized on one computer and/or distributed between two or more computers. In addition, these components can execute from various computer readable media having various data structures stored thereon. In another example, the computer-readable medium can include various sets of codes for causing a computer to interact with information indicative of states associated with a system that implements the subject innovation. The components can communicate by way of local and/or remote processes such as in accordance with a signal having one or more data packets (e.g., data from one component interacting with another component in a local system, distributed system, and/or across a network such as the Internet with other systems by way of the signal).

Any aspect or design described herein as "exemplary" is not necessarily to be construed as preferred or advantageous over other aspects or designs. Similarly, examples are provided herein solely for purposes of clarity and understanding and are not meant to limit the subject innovation or portion thereof in any manner. It is to be appreciated that a myriad of additional or alternate examples could have been presented, but have been omitted for purposes of brevity.

Furthermore, all or portions of the subject innovation can be implemented as a system, method, apparatus, or article of manufacture using standard programming and/or engineering techniques to produce software, firmware, hardware or any combination thereof to control a computer to implement the disclosed innovation. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 10:
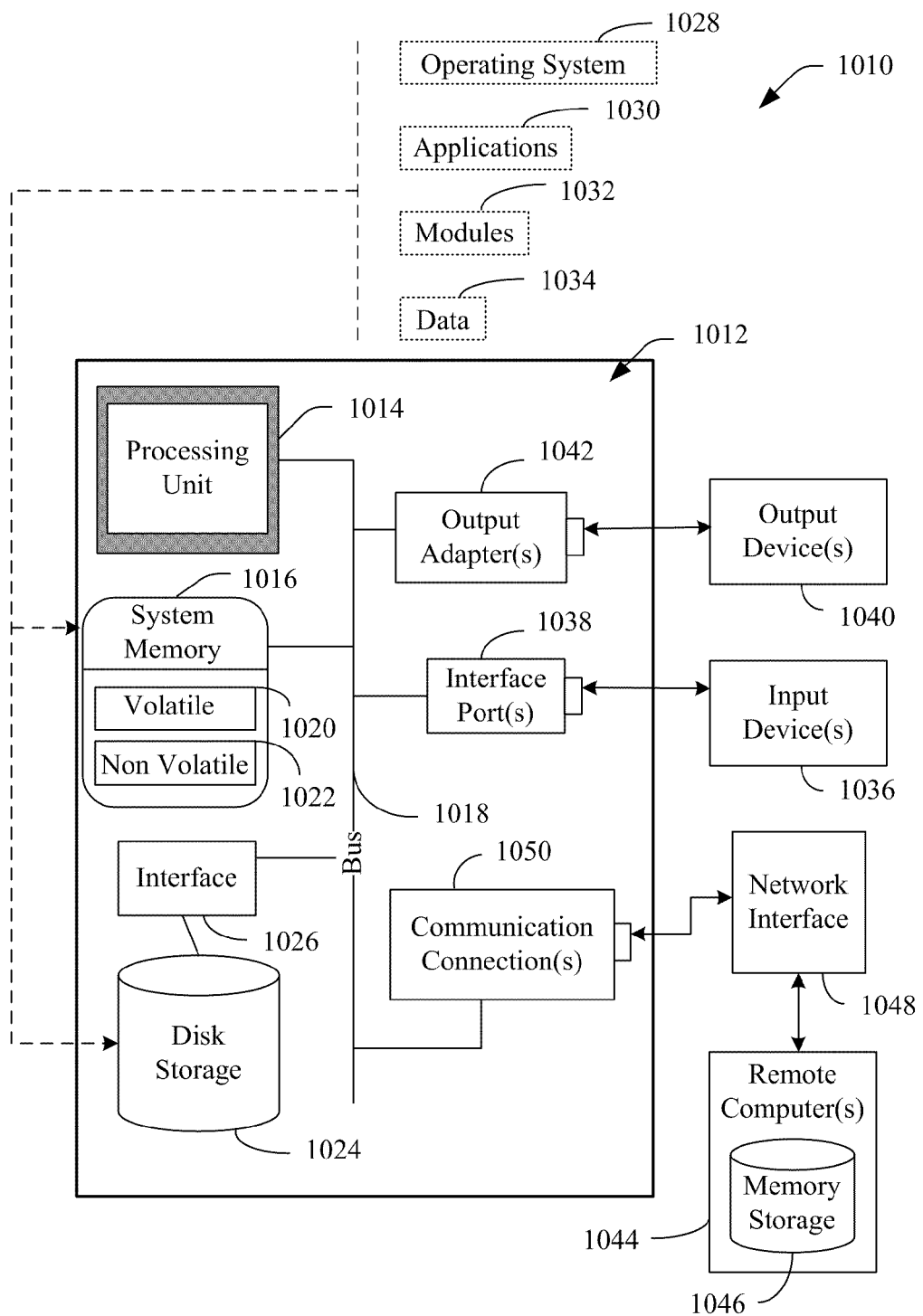
FIG. 10 illustrates an exemplary operating environment for implementing various aspects of the subject innovation.
Figure 11:
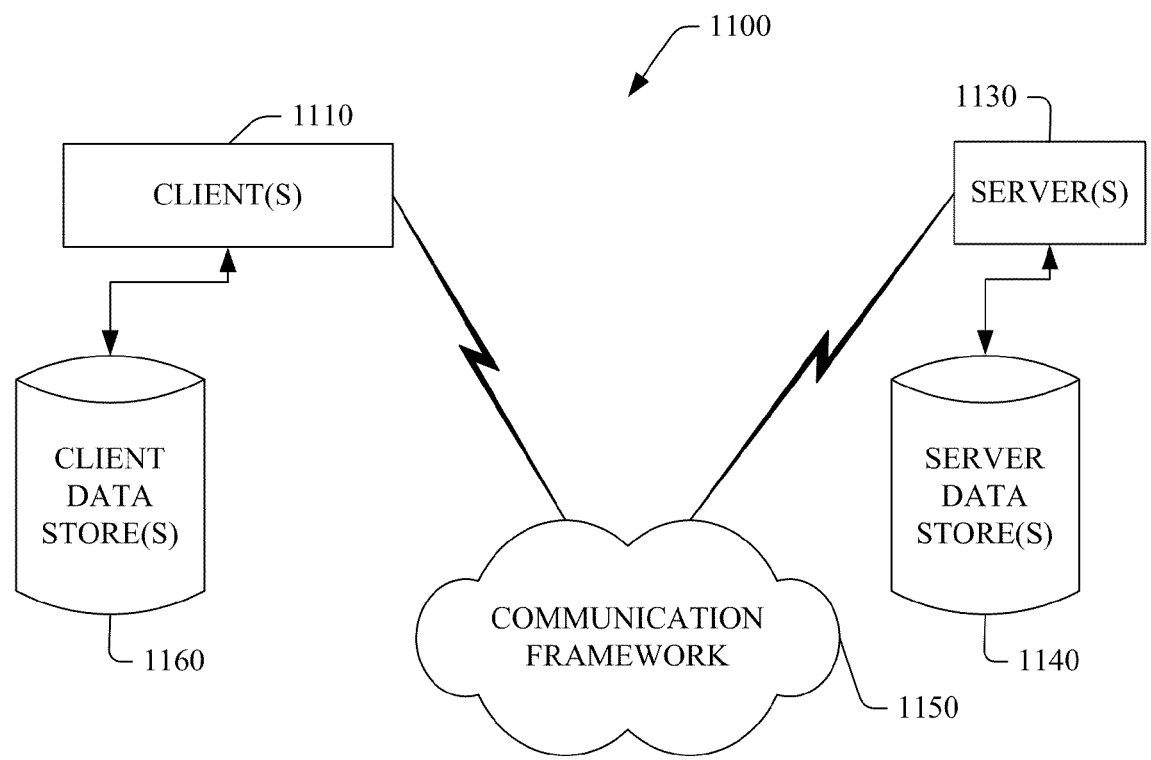
FIG. 11 illustrates a schematic block diagram of a sample computing environment with which the subject innovation can interact.

In order to provide a context for the various aspects of the disclosed subject matter, FIGS. 10 and 11 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the innovation also may be implemented in combination with other program modules. Generally, program modules include routines, programs, components, data structures, etc. that perform particular tasks and/or implement particular abstract data types. Moreover, those skilled in the art will appreciate that the innovative methods can be practiced with other computer system configurations, including single-processor or multi-processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the innovation can be practiced on stand-alone computers. In a distributed computing environment, program modules may be located in both local and remote memory storage devices.

With reference to FIG. 10, an exemplary environment 1010 for implementing various aspects of the subject innovation is described that includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable ROM (EEPROM), or flash memory. Volatile memory 1020 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1012 also includes removable/non-removable, volatile/non-volatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-60 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in suitable operating environment 1010. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that various components described herein can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040 that require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

FIG. 11 is a schematic block diagram of a sample-computing environment 1100 that can be employed for predicting likelihood for contact escalations. The system 1100 includes one or more client(s) 1110. The client(s) 1110 can be hardware and/or software (e.g., threads, processes, computing devices). The system 1100 also includes one or more server(s) 1130. The server(s) 1130 can also be hardware and/or software (e.g., threads, processes, computing devices). The servers 1130 can house threads to perform transformations by employing the components described herein, for example. One possible communication between a client 1110 and a server 1130 may be in the form of a data packet adapted to be transmitted between two or more computer processes. The system 1100 includes a communication framework 1150 that can be employed to facilitate communications between the client(s) 1110 and the server(s) 1130. The client(s) 1110 are operably connected to one or more client data store(s) 1160 that can be employed to store information local to the client(s) 1110. Similarly, the server(s) 1130 are operably connected to one or more server data store(s) 1140 that can be employed to store information local to the servers 1130.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims.

Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
    a storage device, coupled to a processing device, that stores computer-executable components, comprising:
        a prediction component that predicts a time period associated with a likelihood of an escalation for a contact, the time period is based on a defined criterion changeable from one user to another user, wherein the escalation is an abandonment of an initial request in favor of another request requiring a first resource of the contact center that is determined to be more expensive than a second resource required by the initial request;
        a routing component that routes the contact based on the likelihood of the escalation; and
        an artificial intelligence component that determines the likelihood of the escalation for the contact based on an artificial intelligence model.

2. The system of claim 1, wherein the computer-executable components further comprise an analysis component that performs a cost-benefit analysis for contacts and resources of the system.

3. The system of claim 1, wherein the computer-executable components further comprise a queuing model generated based at least in part on the likelihood of the escalation for the contact.

4. The system of claim 1, wherein the escalation is a follow-up of the initial request, via a channel that is determined to be more expensive than an original channel via which the initial request is sent to the system.

5. The system of claim 1, wherein the prediction component is associated with a monitor component that monitors social networking data associated with a social network.

6. The system of claim 5, wherein the monitor component further comprises a search engine that searches queries submitted to the social network.

7. The system of claim 1, wherein the computer-executable components further comprise an evaluation component that evaluates historical data representing a history of a customer with the system, to facilitate prediction of the escalation of the contact.

8. The system of claim 7, wherein the computer-executable components further comprise an instigation component that initiates operation for the routing component.

9. The system of claim 1, wherein the artificial intelligence component determines the likelihood of the escalation of the contact based on a Markov model.

10. A method of routing a contact, comprising:
- predicting, by a contact center device comprising a processor, a time for an escalation likelihood of a contact received by the contact center device via a prediction component, wherein the time period is based on a first criterion changeable from one user identity to another user identity;
- employing the time for the escalation likelihood as a second criterion for resource matching by the contact center;
- routing the contact based on the escalation likelihood; and
- determining a percentage chance of the likelihood of the escalation of the contact based on an artificial intelligence model.

11. The method of claim 10, further comprising prioritizing the contact based on the escalation likelihood.

12. The method of claim 10, wherein the predicting is based on at least one of a subject matter of the contact, or a character trait of a customer identity generating the contact, or an environment of the contact.

13. The method of claim 10, wherein the contact is submitted to a social network data store before being received by the contact center device.

14. The method of claim 10, further comprising:
- engaging in a remedial measure to appease a customer identity determined to have submitted the contact; and
- prolonging an escalation period.

15. The method of claim 10, wherein the predicting is based on employing a queuing model with Markov chains.

16. The method of claim 15, further comprising updating the queuing model responsive to model update data received or determined by the contact center device.

17. The method of claim 10, further comprising matching the contact to a resource of the contact center device based on the predicting.

18. The method of claim 10, further comprising facilitating the predicting via an inference supplied by an inference component.

19. A contact center system, comprising:
- means for predicting a time for an escalation likelihood of a contact, wherein the time for the escalation likelihood is employed as at least part of a model for resource matching in the contact center system and the time period is based on a criterion changeable from one user identity to another user identity;
- means for routing the contact based on the escalation likelihood; and
- means for determining a percentage chance of the likelihood of the escalation of the contact based on an artificial intelligence model.

20. The contact center system of claim 19, further comprising means for analyzing defined costs relative to defined benefits of contacts and resources associated with the contact center system.

* * * * *